United States Patent
Bae et al.

(10) Patent No.: US 11,680,443 B2
(45) Date of Patent: Jun. 20, 2023

(54) VARIABLE TRANSMITTANCE FILM AND SMART WINDOW INCLUDING SAME

(71) Applicant: LG Chem, Ltd., Seoul (KR)

(72) Inventors: Nam Seok Bae, Daejeon (KR); Yong Goo Son, Daejeon (KR); Seung Heon Lee, Daejeon (KR); Taegyun Kwon, Daejeon (KR); Youngsik Yoon, Daejeon (KR)

(73) Assignee: LG Chem, Ltd.

( * ) Notice: Subject to any disclaimer, the term of this patent is extended or adjusted under 35 U.S.C. 154(b) by 326 days.

(21) Appl. No.: 16/962,682

(22) PCT Filed: Apr. 19, 2019

(86) PCT No.: PCT/KR2019/004755
§ 371 (c)(1),
(2) Date: Jul. 16, 2020

(87) PCT Pub. No.: WO2019/203612
PCT Pub. Date: Oct. 24, 2019

(65) Prior Publication Data
US 2020/0362623 A1    Nov. 19, 2020

(30) Foreign Application Priority Data

Apr. 20, 2018 (KR) .................. 10-2018-0046381
Apr. 20, 2018 (KR) .................. 10-2018-0046395

(51) Int. Cl.
*E06B 9/24* (2006.01)
*G02F 1/1339* (2006.01)
(Continued)

(52) U.S. Cl.
CPC ............ *E06B 9/24* (2013.01); *G02F 1/13394* (2013.01); *G02F 1/13476* (2013.01);
(Continued)

(58) Field of Classification Search
CPC ............ G02F 1/133377; G02F 1/1334; G02F 1/1681
See application file for complete search history.

(56) References Cited

U.S. PATENT DOCUMENTS

| 2002/0030785 | A1 | 3/2002 | Enomoto et al. |
| 2008/0111965 | A1 | 5/2008 | Tomita |
| 2010/0188731 | A1* | 7/2010 | Kanematsu ........... G02F 1/1679 359/296 |
| 2012/0073116 | A1* | 3/2012 | Lim ..................... G02F 1/1679 29/592.1 |

(Continued)

FOREIGN PATENT DOCUMENTS

| CN | 101223473 A | 7/2008 |
| CN | 102540613 A | 7/2012 |

(Continued)

OTHER PUBLICATIONS

European Search Report for Application No. 19788115.4, dated Apr. 23, 2021, 4 pages.

(Continued)

*Primary Examiner* — Jessica M Merlin
(74) *Attorney, Agent, or Firm* — Lerner David LLP

(57) ABSTRACT

A variable transmittance film includes a first electrode substrate and a second electrode substrate which are provided to face each other; and a liquid receiving layer which is provided between the first electrode substrate and the second electrode substrate and comprises a liquid substance, and a partition wall pattern that divides the liquid substance into two or more spaces, in which at least a part of the partition wall pattern comprises a passageway region that connects the adjacent spaces.

12 Claims, 6 Drawing Sheets

(51) Int. Cl.
*G02F 1/1347* (2006.01)
*G02F 1/1333* (2006.01)
*G02F 1/1681* (2019.01)
*G02F 1/1334* (2006.01)

(52) U.S. Cl.
CPC ............... *G02F 1/133377* (2013.01); *E06B 2009/2464* (2013.01); *G02F 1/1334* (2013.01); *G02F 1/1681* (2019.01); *G02F 2201/12* (2013.01)

(56) References Cited

U.S. PATENT DOCUMENTS

| | | |
|---|---|---|
| 2012/0120477 A1 | 5/2012 | Biver et al. |
| 2012/0200910 A1 | 8/2012 | Hayashi |
| 2014/0104676 A1 | 4/2014 | Suh et al. |
| 2018/0074377 A1 | 3/2018 | You et al. |

FOREIGN PATENT DOCUMENTS

| | | |
|---|---|---|
| JP | 2002090783 A | 3/2002 |
| JP | 2008064888 A | 3/2008 |
| JP | 2008281693 A | 11/2008 |
| JP | 2009251215 A | 10/2009 |
| JP | 2011048089 A | 3/2011 |
| JP | 2012163894 A | 8/2012 |
| JP | 2012173539 A | 9/2012 |
| JP | 2013500504 A | 1/2013 |
| JP | 2013041034 A | 2/2013 |
| JP | 2018507443 A | 3/2018 |
| KR | 20120011532 A | 2/2012 |
| KR | 20120033790 A | 4/2012 |
| KR | 20150125051 A | 11/2015 |
| KR | 20170012753 A | 2/2017 |
| KR | 20170025960 A | 3/2017 |
| WO | WO-2007141525 A1 * | 12/2007 ....... G02F 1/133377 |

OTHER PUBLICATIONS

International Search Report for Application No. PCT/KR3019/004755 dated Jul. 30, 2019, 2 pages.

Search Report dated Sep. 23, 2022 from the Office Action for Chinese Application No. 201980009780.7 dated Sep. 30, 2022, 2 pages.

* cited by examiner

[Figure 1]
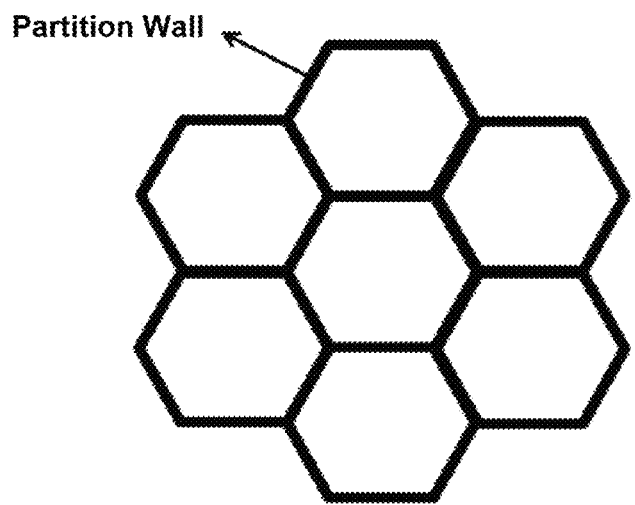
[Figure 2]
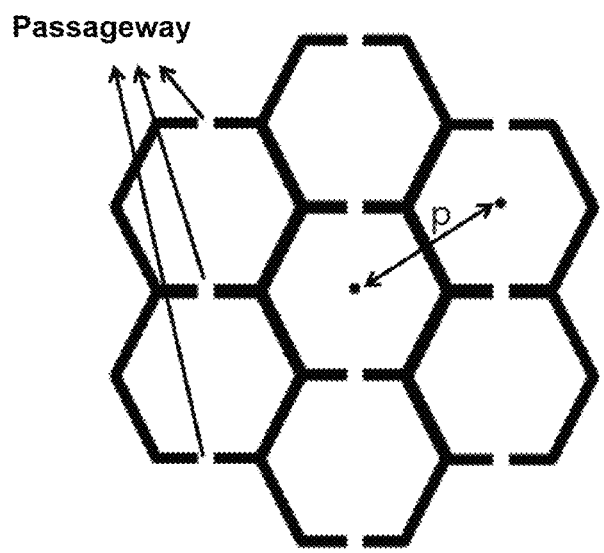

[Figure 3]
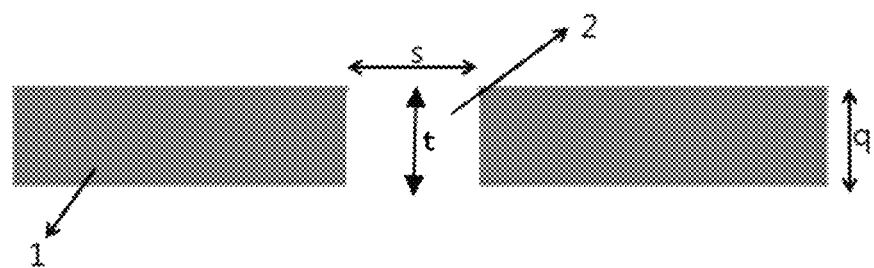
[Figure 4]
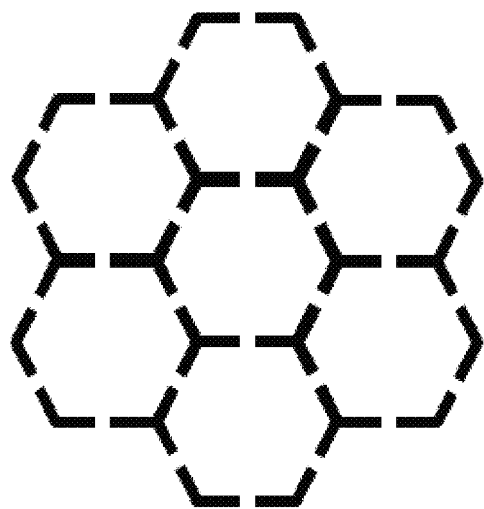

[Figure 5]
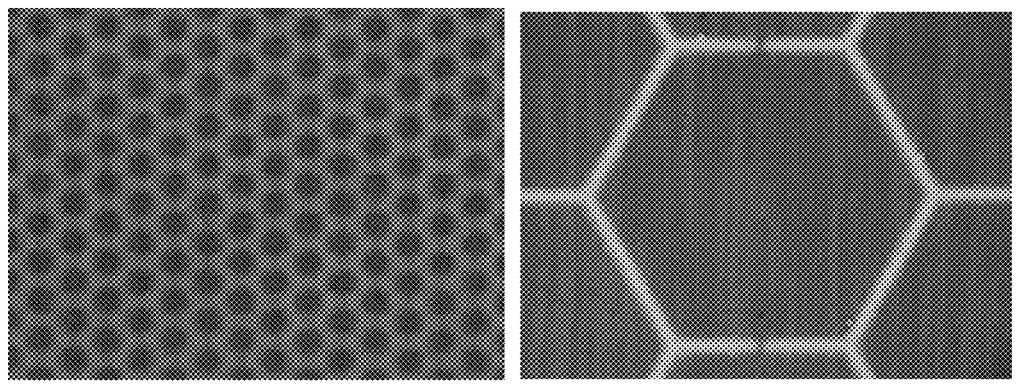
[Figure 6]
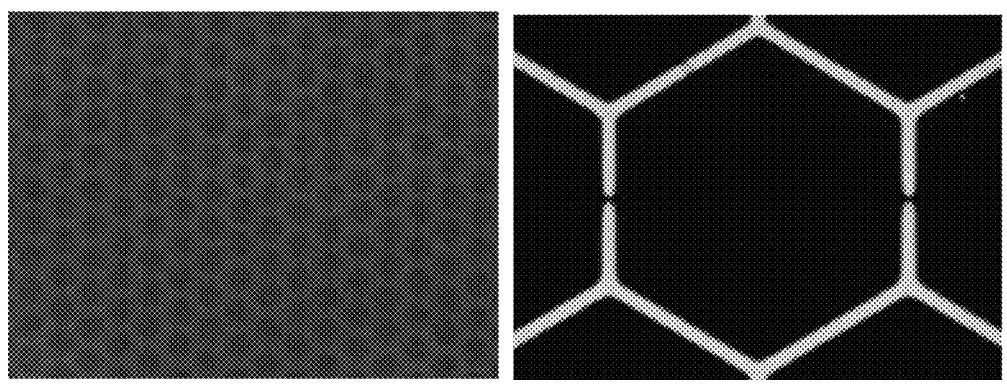
[Figure 7]
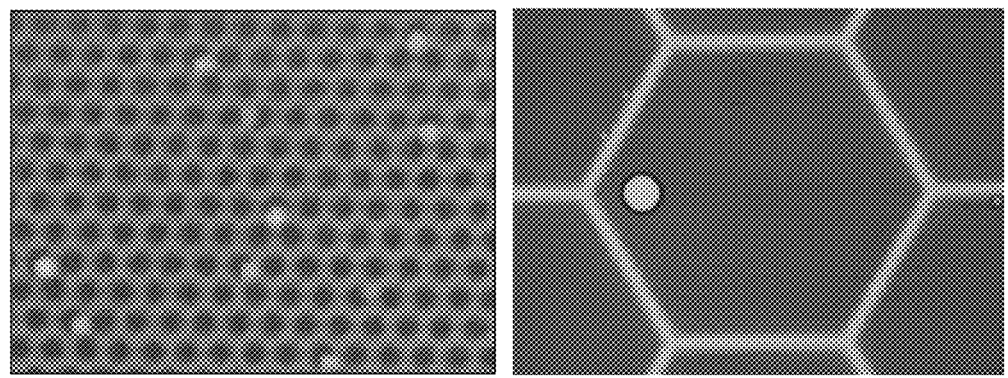

[Figure 8]
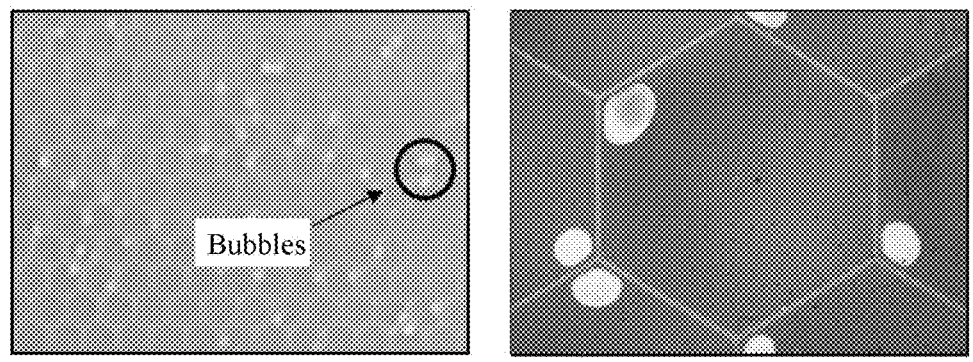
[Figure 9]
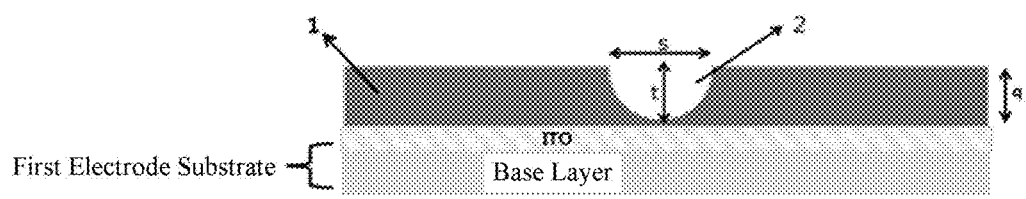

[Figure 10]
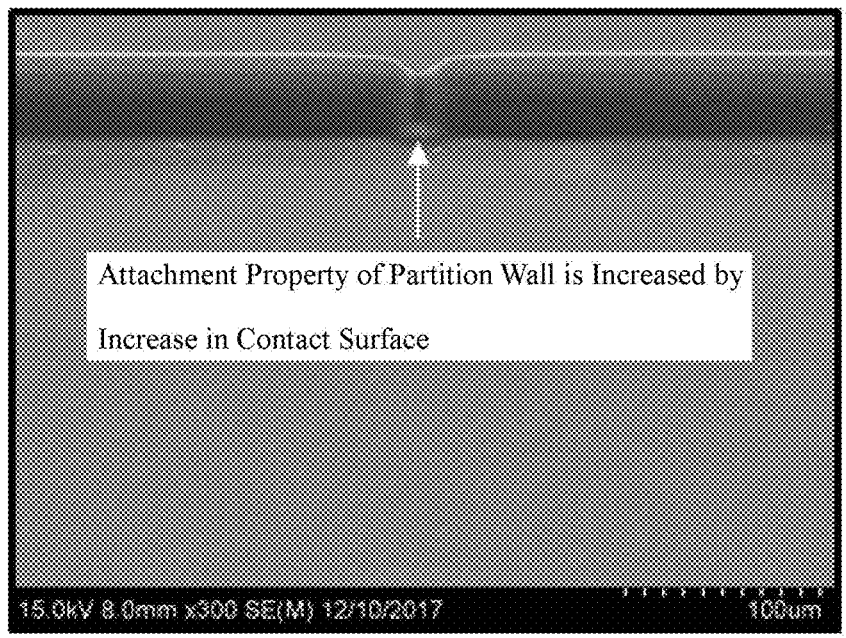
[Figure 11]
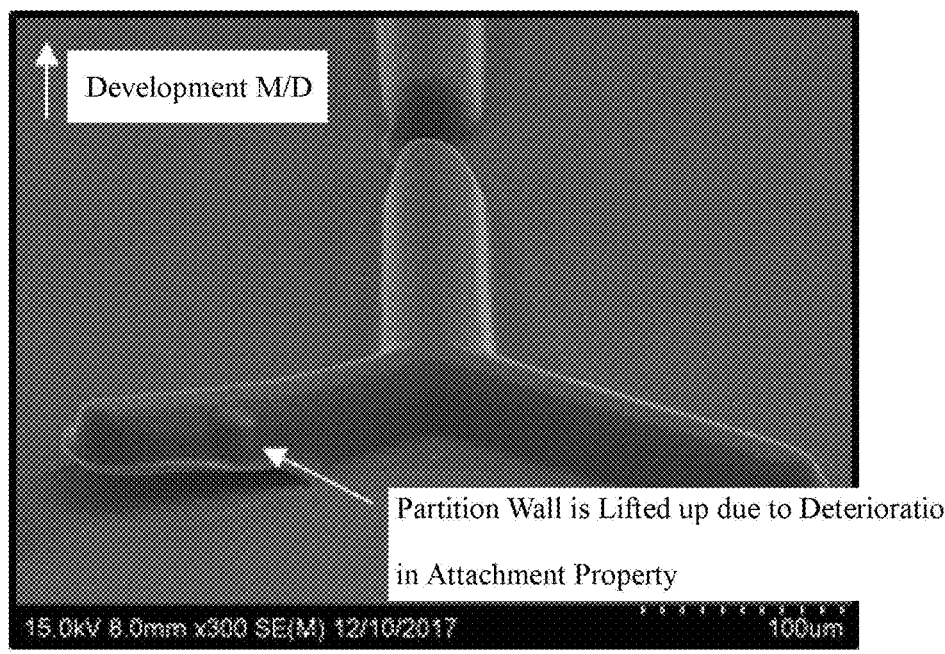

[Figure 12]
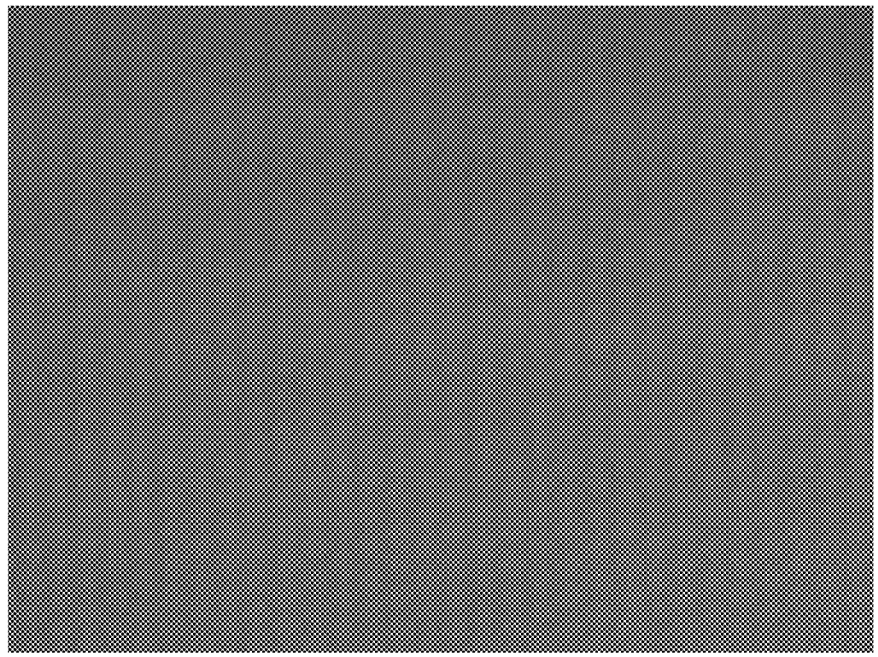
[Figure 13]
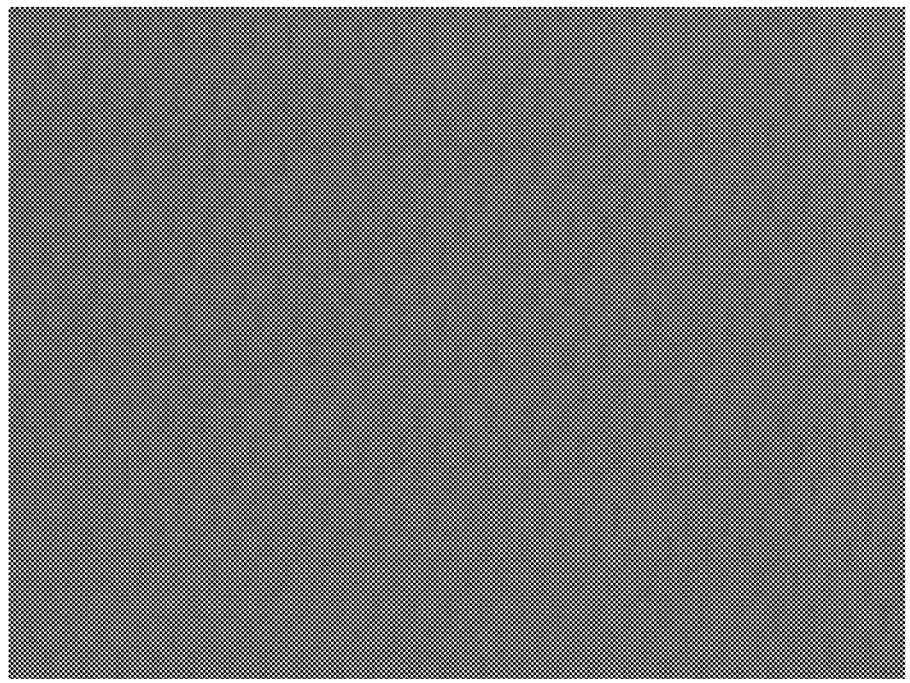

VARIABLE TRANSMITTANCE FILM AND SMART WINDOW INCLUDING SAME

CROSS-REFERENCE TO RELATED APPLICATION(S)

The present application is a national phase entry under 35 U.S.C. § 371 of International Application No. PCT/KR2019/004755, filed on Apr. 19, 2019, which claims priority from Korean Patent Application Nos. 10-2018-0046381 and 10-2018-0046395 filed with the Korean Intellectual Property Office on Apr. 20, 2018, the entire contents of which are incorporated herein by reference.

TECHNICAL FIELD

The present application relates to a variable transmittance film and a smart window comprising the same.

BACKGROUND ART

A variable transmittance film is easy to transmit and block light entering from outside and thus may be used for a smart window for building, a sunroof for a vehicle, and a light blocking film for a transparent display. In this case, it is essential for the variable transmittance film to maintain a constant cell gap between two substrates.

A partition wall such as a ball spacer, a column spacer, and a honeycomb pattern may be representatively used to maintain the cell gap. However, in the case of the ball spacer and the column spacer, there is a problem of an external appearance defect that occurs as a liquid is inclined toward a lower end by gravity when the film having a large area is vertically placed. Therefore, in the field of the variable transmittance film, researches are being conducted to solve the problem of the external appearance defect by means of a technology for patterning the partition wall.

DETAILED DESCRIPTION OF THE INVENTION

Technical Problem

The present application provides a variable transmittance film and a smart window comprising the same.

Technical Solution

An exemplary embodiment of the present application provides a variable transmittance film comprising: a first electrode substrate and a second electrode substrate which are provided to face each other; and a liquid receiving layer which is provided between the first electrode substrate and the second electrode substrate and comprises a liquid substance, and a partition wall pattern that divides the liquid substance into two or more spaces, in which at least a part of the partition wall pattern comprises a passageway region that connects the adjacent spaces.

In addition, another exemplary embodiment of the present application provides a smart window comprising the variable transmittance film.

Advantageous Effects

According to the variable transmittance film of the exemplary embodiment of the present application, it is possible to obtain an improved effect related to an external appearance of the cells because it is possible to remove bubbles produced during a process of joining the cells even though the variable transmittance film is manufactured to have a large area.

BRIEF DESCRIPTION OF DRAWINGS

FIG. 1 is a view illustrating a shape of a partition wall pattern of a variable transmittance film according to an exemplary embodiment.

FIG. 2 is a view illustrating a shape in which passageway regions are provided in a pair of rim regions that face each other in the partition wall pattern of the variable transmittance film according to the exemplary embodiment.

FIG. 3 is a view schematically illustrating a shape of the passageway region of the variable transmittance film according to the exemplary embodiment.

FIG. 4 is a view illustrating a shape in which the passageway regions are provided in the two or three pairs of rim regions that face one another in the partition wall pattern of the variable transmittance film according to the exemplary embodiment.

FIG. 5 is an OM image made by capturing, in a light transmitting mode, an image of a partition wall internal space in a variable transmittance film manufactured according to Example 1.

FIG. 6 is an OM image made by capturing, in a light transmitting mode, an image of a partition wall internal space in a variable transmittance film manufactured according to Example 2.

FIG. 7 is an OM image made by capturing, in a light transmitting mode, an image of a partition wall internal space in a variable transmittance film manufactured according to Comparative Example 1.

FIG. 8 is an OM image made by capturing, in a light transmitting mode, an image of a partition wall internal space in a variable transmittance film manufactured according to Comparative Example 2.

FIG. 9 is a view schematically illustrating a shape of the passageway region of the variable transmittance film according to the exemplary embodiment.

FIG. 10 is an SEM image made by capturing an image of a section of a partition wall pattern in a variable transmittance film manufactured according to Example 3.

FIG. 11 is an SEM image made by capturing an image of a section of the partition wall pattern in the variable transmittance film according to the exemplary embodiment.

FIG. 12 is a photograph made by capturing an image of the partition wall pattern after performing a development process during a process of manufacturing the variable transmittance film according to Example 3.

FIG. 13 is a photograph made by capturing an image of a partition wall pattern after performing a development process during a process of manufacturing a variable transmittance film according to Example 4.

DESCRIPTION OF REFERENCE NUMERALS

1: Partition wall pattern
2: Passageway region
p: Pitch of partition wall pattern
q: Thickness of partition wall pattern
s: Width of passageway region
t: Thickness of passageway region

DETAILED DESCRIPTION

Hereinafter, the present application will be described in more detail.

A variable transmittance film according to an exemplary embodiment of the present application comprises: a first electrode substrate and a second electrode substrate which are provided to face each other; and a liquid receiving layer which is provided between the first electrode substrate and the second electrode substrate and comprises a liquid substance, and a partition wall pattern that divides the liquid substance into two or more spaces, in which at least a part of the partition wall pattern comprises a passageway region that connects the adjacent spaces.

In the present application, the variable transmittance film means a film of which the light transmittance may vary in accordance with whether a voltage is applied. In this case, the light transmittance means a ratio of intensity of light, which has penetrated a substance layer or an interface, to intensity of incident light.

To implement a variable transmittance element, the light transmittance needs to vary by about 10% or more between before and after applying the voltage. More specifically, the light transmittance may vary by about 10% or more, about 20% or more, about 40% or more, about 60% or more, or about 80% or more between before and after applying the voltage.

In the present application, the "light" may mean visible light, for example, light having a wavelength ranging from 380 nm to 780 nm.

In addition, in the present application, the term "on", which is used to express a positional relationship between components, is used as a meaning that corresponds to "above" or "at an upper side", and this term may mean that one component positioned at a certain position is present on another component while directly adjoining the another component, or may mean that one component is present between another component and the other component.

Typically, it is essential to use two electrode substrates to manufacture an electrophoretic variable transmittance film. In addition, it is necessary to maintain a cell gap to prevent a stained external appearance of the variable transmittance film and non-uniformity of optical characteristics.

In this case, a patterned partition wall may be representatively used to maintain the cell gap. However, there is a problem in that bubbles are not efficiently discharged during a process of laminating upper and lower plate films, and the bubbles are trapped in a space defined by the partition wall. The defect tends to become severe as a viscosity of a liquid substance is increased, and the defect tends to become more severe due to the expansion of bubbles during a process of evaluating reliability of the cell, and as a result, the defect is considered as a big problem related to evaluation of an external appearance and durability of the cell.

The variable transmittance film according to the exemplary embodiment of the present application may be applied not only to the electrophoretic cell, but also to a liquid-based cell such as a polymer dispersed liquid crystal (PDLC) cell or an electrochromic (EC) cell.

In the variable transmittance film according to the exemplary embodiment of the present application, the liquid receiving layer, which comprises the partition wall pattern that divides the liquid substance into the two or more spaces, may be formed by a process such as roll-to-roll photolithography, roll-to-roll imprinting, photolithography, or imprinting. In this case, the partition wall pattern may be formed by providing an acrylic-based or epoxy-based polymeric layer on any one electrode substrate and patterning the polymeric layer. Because the roll-to-roll imprinting or the imprinting may cause a problem in that an electrode surface is not exposed due to a residual film and a drive voltage is increased, the liquid receiving layer may be formed by the roll-to-roll photolithography or the photolithography process.

In the exemplary embodiment of the present application, the partition wall pattern may comprise a rim structure having closed figures continuously connected. The closed figure may be an n-gon (n is an even number), and more specifically, the closed figure is a quadrangle or a hexagon. FIG. 1 illustrates that the partition wall pattern according to the exemplary embodiment of the present application has the hexagonal closed figures.

In the exemplary embodiment of the present application, a pitch of the partition wall pattern may be 100 µm to 3,000 µm or 200 µm to 3,000 µm. In this case, the pitch of the partition wall pattern means a distance p between centers of gravity of the adjacent closed figures, and FIG. 2 illustrates the pitch p of the partition wall pattern.

In a case in which the pitch of the partition wall pattern is 100 µm or more, it is possible to minimize a loss of optical characteristics, such as an increase in haze, because an area ratio of the partition wall pattern is increased. It is possible to prevent a stain caused by non-uniformity of the cell gap in a case in which the pitch of the partition wall pattern is 3,000 µm or less.

In the exemplary embodiment of the present application, a thickness q of the partition wall pattern may be 5 µm to 50 µm, and particularly 10 µm to 50 µm. In this case, the thickness of the partition wall means a shortest distance from a point adjoining the first electrode substrate to a point adjoining the second electrode substrate.

It is possible to prevent a problem of a precipitation defect caused by solubility of the liquid substance having a high concentration in a case in which the thickness of the partition wall pattern is 5 µm or more. It may be easy to ensure a variable transmittance range in a case in which the thickness of the partition wall pattern is 50 µm or less.

In the exemplary embodiment of the present application, at least a part of the partition wall pattern may comprise the passageway region that connects the adjacent spaces. The passageway region may be formed by a process of patterning a partial region of the partition wall pattern.

In the exemplary embodiment of the present application, one surface of the partition wall pattern adjoins the first electrode substrate, and the other surface of the partition wall pattern, which is opposite to the one surface adjoining the first electrode substrate, adjoins the second electrode substrate. In this case, based on an overall horizontal cross-sectional area of the one surface of the partition wall pattern which adjoins the first electrode substrate, an area of the region in which the passageway region is provided may be more than 0% and equal to or less than 30%, more than 0% and equal to or less than 10%, or more than 0% and equal to or less than 5%. In a case in which the area of the region in which the passageway region is provided is more than 0% and equal to or less than 30% based on the overall horizontal cross-sectional area of the one surface of the partition wall pattern which adjoins the first electrode substrate, it is possible to obtain an effect of removing bubbles produced during the process of joining the cells, which is an effect desired to be achieved by the present application, even though the variable transmittance film is manufactured to have a large area. In addition, in a case in which the area of the region in which the passageway region is provided is more than 30% based on the overall horizontal cross-sectional area of the one surface of the partition wall pattern which adjoins the first electrode substrate, the partition wall pattern is disconnected, which causes a deterioration in attachment property, and an effect of storing the liquid substance may relatively deteriorate.

In the exemplary embodiment of the present application, a thickness of the passageway region may be equal to the thickness of the partition wall pattern. In this case, the thickness of the passageway region means a maximum length of the partition wall pattern in a thickness direction.

In a case in which the thickness of the passageway region is equal to the thickness of the partition wall pattern, it is possible to effectively remove bubbles produced during the process of joining the cells. In a case in which there is no passageway region in the partition wall pattern, bubbles may be trapped in the spaces defined by the partition wall pattern.

In the case in which the thickness of the passageway region is equal to the thickness of the partition wall pattern, the entirety of the one surface of the partition wall pattern, except for the passageway region, may adjoin the first electrode substrate, and the entirety of the other surface of the partition wall pattern, which is opposite to the one surface adjoining the first electrode substrate, except for the passageway region, may adjoin the second electrode substrate.

In the exemplary embodiment of the present application, the thickness of the passageway region may be 0.05 to 0.95 times the thickness of the partition wall pattern. In this case, the thickness of the passageway region means the maximum length of the partition wall in the thickness direction.

In a case in which the thickness of the passageway region is 0.05 to 0.95 times the thickness of the partition wall pattern, the entirety of the one surface of the partition wall pattern, comprising the passageway region, may adjoin the first electrode substrate, and the entirety of the other surface of the partition wall pattern, which is opposite to the one surface adjoining the first electrode substrate, except for the passageway region, may adjoin the second electrode substrate.

In a case in which the thickness of the passageway region is 0.05 to 0.95 times the thickness of the partition wall pattern, it is possible to effectively remove bubbles produced during the process of joining the cells, and it is possible to prevent the partition wall pattern from being lifted up due to external force applied while the partition wall pattern passes through a development zone and a drying zone with an air knife.

FIG. 11 illustrates an SEM image made by capturing an image of a section of the partition wall pattern in the variable transmittance film according to the exemplary embodiment of the present application. More specifically, FIG. 11 illustrates a state in which the partition wall pattern is lifted up due to external force applied while the partition wall pattern passes through the development zone and the drying zone with the air knife, which is a problem that may occur in the case in which the thickness of the passageway region is equal to the thickness of the partition wall pattern.

Therefore, in the exemplary embodiment of the present application, the case in which the thickness of the passageway region is 0.05 to 0.95 times the thickness of the partition wall pattern is more preferable than the case in which the thickness of the passageway region is equal to the thickness of the partition wall pattern.

In the exemplary embodiment of the present application, a width s of the passageway region may be 1 µm to 50 µm, and particularly, 5 µm to 50 µm. In this case, the width s of the passageway region means a maximum length of the passageway region in a direction perpendicular to the thickness direction.

In a case in which the width of the passageway region is 1 µm or more, bubbles may be efficiently removed during the process of laminating the upper and lower plate films. FIG. 3 illustrates a thickness q of a partition wall pattern 1, a width s of a passageway region 2, and a thickness t of the passageway region in the variable transmittance film according to the exemplary embodiment of the present application.

In the exemplary embodiment of the present application, the shape of the passageway region is not particularly limited.

In the exemplary embodiment of the present application, the closed figure is an n-gon (n is an even number), and the passageway regions may be provided in at least a pair of rim regions of the n-gon which face each other. The passageway regions, which are provided in at least a pair of rim regions which face each other, means that the passageway regions are provided in a direction perpendicular to a pair of partition wall patterns which face each other in parallel. FIG. 2 illustrates a state in which the closed figure is a hexagon and the passageway regions are provided in the pair of rim regions of the hexagon which face each other.

In comparison with a case in which the passageways are provided in the two or three pairs of rim regions, the case in which the passageway regions are provided in the pair of rim regions which face each other does not allow the liquid substance to freely move in the vertical direction in the cell, and as a result, it is possible to prevent the liquid substance from being inclined by gravity, for example, prevent a gravity defect when the variable transmittance film is placed vertically. FIG. 4 illustrates a state in which the passageway regions are provided in the two or three pairs of rim regions.

In the exemplary embodiment of the present application, the first electrode substrate may comprise a first base, and a transparent conductive oxide layer provided on the first base. In addition, the second electrode substrate may comprise a second base, and a metal layer, a metal oxide layer, a metal nitride layer, a metal oxynitride layer, or a metal alloy layer provided on the second base and opposite to the transparent conductive oxide layer.

The first and second bases may be, but not limited to, a glass or transparent plastic base having excellent transparency, excellent surface smoothness, excellent tractability, and excellent waterproofness, but the type of transparent base is not limited as long as the transparent base is typically used for an electronic element. Specifically, each of the first and second bases may be made of glass, urethane resin, polyimide resin, polyester resin, (meth)acrylate-based polymeric resin, or polyolefin-based resin such as polyethylene resin or polypropylene resin.

The transparent conductive oxide layer comprised in the first electrode substrate may comprise transparent conductive oxide.

Examples of the transparent conductive oxide may comprise, but not limited to, indium tin oxide (ITO), indium oxide ($In_2O_3$), indium gallium oxide (IGO), fluoro-doped tin oxide (FTO), aluminum-doped zinc oxide (AZO), gallium-doped zinc oxide (GZO), antimony-doped tin oxide (ATO), indium-doped zinc oxide (IZO), niobium-doped titanium oxide (NTO), zinc oxide (ZnO), or cesium tungsten oxide (CTO).

In the exemplary embodiment of the present application, forming the transparent conductive oxide layer on the first base may use a method known in this technical field. More specifically, the forming of the transparent conductive oxide layer on the first base may use, but not limited to, a deposition process or the like.

In the exemplary embodiment of the present application, the transparent conductive oxide layer comprised in the first electrode substrate may be provided on the entire surface of the first base.

The metal layer, the metal oxide layer, the metal nitride layer, the metal oxynitride layer, or the metal alloy layer comprised in the second electrode substrate is provided on the second base and may comprise one or more components selected from a group consisting of at least one of metals comprising gold, silver, aluminum, copper, neodymium, molybdenum, and nickel, oxide comprising one or more of the metals, nitride comprising one or more of the metals, oxynitride comprising one or more of the metals, and an alloy comprising two or more of the metals.

In the exemplary embodiment of the present application, forming the metal layer, the metal oxide layer, the metal nitride layer, the metal oxynitride layer, or the metal alloy layer on the second base may use a method known in this technical field such as photolithography, photoresist, or reverse offset.

In the exemplary embodiment of the present application, the metal layer, the metal oxide layer, the metal nitride layer, the metal oxynitride layer, or the metal alloy layer comprised in the second electrode substrate may be provided as a patterned layer, and a line width of the pattern may be 1 μm to 20 μm. In this case, in a case in which the line width of the pattern is less than 1 μm, it is difficult to manufacture the variable transmittance film having a large area, an operating speed of the variable transmittance film may be decreased due to high resistance, and a drive voltage may be increased.

In the exemplary embodiment of the present application, a thickness of the metal layer, the metal oxide layer, the metal nitride layer, the metal oxynitride layer, or the metal alloy layer comprised in the second electrode substrate may be 0.1 μm to 10 μm.

In the exemplary embodiment of the present application, the liquid substance may be a solvent in which colored charged particles are dispersed.

The colored charged particle may mean a charged particle having a color, the color may be, but not limited to, a chromatic color or an achromatic color, for example, black, and the color may be variously changed depending on the object and features of the invention.

The colored charged particles may serve to block light transmission when no voltage is applied.

The colored charged particle may comprise one or more of a metal particle, an inorganic particle, a polymer particle, and a combination thereof. More specifically, the colored charged particle may be, but not limited to, a metal particle comprising an element such as aluminum, copper, silver, silicon, carbon, iron, nickel, gold, titanium, zinc, zirconium, and tungsten, and a combination thereof, a polymer particle such as polystyrene, polypropylene, polyvinyl chloride, polyethylene, and polypropylene, or an inorganic particle such as carbon black.

In the exemplary embodiment of the present application, a viscosity of the liquid substance may be 1 cps to 1,000 cps.

In the exemplary embodiment of the present application, the colored charged particle may be an inorganic particle, and more particularly, carbon black.

The variable transmittance film according to the exemplary embodiment of the present application may further comprise release layers which are formed on one surface of the first electrode substrate and one surface of the second electrode substrate of the variable transmittance film, respectively.

A method of forming the release layer is not particularly limited, but the release layer may be formed on one surface of each of the first electrode substrate and the second electrode substrate of the variable transmittance film by performing bar coating using a Meyer bar and then performing drying and UV-curing processes.

A material of the release layer is not particularly limited, but particularly, the release layer may be made of fluorine-based UV-curable resin.

A thickness of the release layer may range from 10 nm to 1,000 nm, and when the thickness range is satisfied, it is possible to prevent the colored charged particles in the liquid receiving layer from being adsorbed onto the electrode surface.

Since the surface release layer film is further provided, it is possible to prevent the colored charged particles in the liquid receiving layer from being adsorbed onto the electrode surface.

A smart window according to the exemplary embodiment of the present application may comprise the above-mentioned variable transmittance film, and a voltage applying device electrically connected to the variable transmittance film.

The type of voltage applying device is not particularly limited as long as the voltage applying device may apply a voltage to the variable transmittance film.

Mode for Invention

Hereinafter, the present invention will be described in more detail with reference to Examples. However, the following Examples are intended to illustratively describe the present invention, and the scope of the present invention is not limited by the following Examples.

EXAMPLES

Example 1

ITO was deposited on the entire surface of a PET base by a sputtering process, and the ITO was coated with UV-curable resin to have a thickness of 30 μm. A photo mask having a honeycomb pattern shape comprising a passageway region having a width of 20 μm was positioned on the UV-curable resin, the UV-curable resin was irradiated with ultraviolet rays with an exposure value of 440 mJ/cm$^2$, and non-cured parts were removed by a development process using an organic stripper, thereby manufacturing a first electrode substrate and a partition wall pattern having a thickness of 30 μm provided on the first electrode substrate. A thickness of the manufactured passageway region was 30 μm equal to the thickness of the partition wall pattern. The passageway regions were formed in a pair of rim regions, which face each other, of a hexagon that constitutes the honeycomb pattern, and shapes of the passageway region are as illustrated in FIGS. 2 and 3. Based on an overall horizontal cross-sectional area of one surface of the partition wall pattern which adjoins the ITO, an area of the region in which the passageway region was provided was about 2%.

A metal oxynitride layer was formed by depositing metal, with a thickness of 200 nm, comprising Al oxynitride on the PET base, and then a resist ink mesh pattern having a thickness of 3 μm was formed by using a reverse offset process. The Al oxynitride layer was etched, and then the resist ink was stripped by using an organic stripper, such that a second electrode substrate was manufactured.

Sealant was applied onto one surface of each of the first and second electrode substrates having the partition wall pattern, carbon black having a viscosity of 30 cps was injected, and then the first and second electrode substrates were laminated. A variable transmittance film was finally manufactured through a process of UV-curing the sealant.

Example 2

A variable transmittance film was manufactured in the same manner as in Example 1 except that carbon black having a viscosity of 250 cps was used.

Example 3

ITO was deposited on the entire surface of a PET base by a sputtering process, and the ITO was coated with UV-curable resin to have a thickness of 30 μm. A photo mask having a honeycomb pattern shape comprising a passageway region having a width of 20 μm was positioned on the UV-curable resin, the UV-curable resin was irradiated with ultraviolet rays with an exposure value of 880 mJ/cm$^2$, and non-cured parts were removed by a development process using an organic stripper, thereby manufacturing a first electrode substrate and a partition wall pattern having a thickness of 30 μm provided on the first electrode substrate. FIG. 10 is an SEM image made by capturing an image of a section of the partition wall pattern. The passageway regions were formed in a pair of rim regions, which face each other, of a hexagon that constitutes a honeycomb pattern, and shapes of the passageway regions are as illustrated in FIGS. 2 and 9. A thickness of the manufactured passageway region was 5 μm, and based on an overall horizontal cross-sectional area of one surface of the partition wall pattern which adjoins the ITO, an area of the region in which the passageway region was provided was about 1.3%.

A metal oxynitride layer was formed by depositing metal, with a thickness of 200 nm, comprising Al oxynitride on the PET base, and then a resist ink mesh pattern having a thickness of 3 μm was formed by using a reverse offset process. The Al oxynitride layer was etched, and then the resist ink was stripped by using an organic stripper, such that a second electrode substrate was manufactured.

Sealant was applied onto one surface of each of the first and second electrode substrates having the partition wall, carbon black having a viscosity of 30 cps was injected, and then the first and second electrode substrates were laminated. A variable transmittance film was finally manufactured through a process of UV-curing the sealant.

Example 4

A variable transmittance film was manufactured in the same manner as in Example 3 except that passageway regions were formed in three pairs of rim regions, which face one another, of a hexagon that constitutes a honeycomb pattern.

Shapes of the passageway regions are as illustrated in FIGS. 4 and 9. A thickness of the manufactured passageway region was 5 μm, and based on an overall horizontal cross-sectional area of one surface of the partition wall pattern which adjoins the ITO, an area of the region in which the passageway region was provided was about 1.3%.

Comparative Example 1

A variable transmittance film was manufactured in the same manner as in Example 1 except that a partition wall pattern having no passageway region was used.

Comparative Example 2

A variable transmittance film was manufactured in the same manner as in Example 2 except that a partition wall pattern having no passageway region was used.

Experimental Example 1

It was captured by using a camera whether bubbles were produced in the spaces defined by the partition wall patterns in the variable transmittance films manufactured according to Examples 1 and 2, and FIGS. 5 and 6 illustrate the captured images.

Specifically, FIG. 5 is a view made by capturing images of a general shape in the cell and a section of the partition wall pattern in the variable transmittance film in which carbon black having a viscosity of 30 cps was injected, and FIG. 6 is a view made by capturing images of a general shape in the cell and a section of the partition wall pattern in the variable transmittance film in which carbon black having a viscosity of 250 cps was injected.

It could be ascertained from FIGS. 5 and 6 that no bubble was produced in the space defined by the patterned partition wall.

It was captured by using a camera whether bubbles were produced in the spaces defined by the partition wall patterns in the variable transmittance films manufactured according to Comparative Examples 1 and 2, and FIGS. 7 and 8 illustrate the captured images.

Specifically, FIG. 7 is a view made by capturing images of a general shape in the cell and a section of the partition wall pattern in the variable transmittance film in which carbon black having a viscosity of 30 cps was injected, and FIG. 8 is a view made by capturing images of a general shape in the cell and a section of the partition wall pattern in the variable transmittance film in which carbon black having a viscosity of 250 cps was injected.

It could be ascertained from FIGS. 7 and 8 that bubbles were produced in the space defined by the non-patterned partition wall.

Experimental Example 2

FIGS. 10, 12, and 13 are views made by capturing, by using a camera, images of the partition wall patterns after performing the development process and before injecting the carbon black, during the processes of manufacturing the variable transmittance films of Examples 3 and 4.

More specifically, FIG. 10 is a view made by capturing an image of a state in which the partition wall pattern is attached to the first electrode substrate in one section according to Example 3. In addition, FIGS. 12 and 13 are photographs made by capturing images of general shapes of the partition wall patterns according to Examples 3 and 4, and it could be ascertained that the partition walls were properly attached to the ITO.

From the above-mentioned results, according to the variable transmittance film of the exemplary embodiment of the present application, it is possible to obtain an improved effect related to an external appearance of the cells because it is possible to remove bubbles produced during a process of joining the cells even though the variable transmittance film is manufactured to have a large area.

The invention claimed is:

1. A variable transmittance film comprising:
a first electrode substrate and a second electrode substrate which are provided to face each other; and
a liquid receiving layer which is provided between the first electrode substrate and the second electrode substrate, wherein the liquid receiving layer comprises a liquid substance, and a partition wall pattern that divides the liquid substance into two or more spaces,
wherein at least a part of the partition wall pattern comprises a passageway region that connects adjacent spaces,
wherein an entirety of one surface of the partition wall pattern, comprising the passageway region, adjoins the first electrode substrate, and an entirety of another surface of the partition wall pattern, which is opposite to the one surface, except for the passageway region, adjoins the second electrode substrate, and
wherein a thickness of the passageway region is 0.05 times to 0.95 times a thickness of the partition wall pattern.

2. The variable transmittance film of claim 1, wherein based on an overall horizontal cross-sectional area of the one surface of the partition wall pattern, an area of a region in which the passageway region is provided is more than 0% and equal to or less than 30%.

3. The variable transmittance film of claim 1, wherein a thickness of the partition wall pattern is 5 μm to 50 μm.

4. The variable transmittance film of claim 1, wherein a width of the passageway region is 1 μm to 50 μm.

5. The variable transmittance film of claim 1, wherein the partition wall pattern comprises a rim structure having figures connected continuously, wherein each figure is an n-gon, wherein n is the number of sides of the figure and is an even number, and where each side of the figure is a rim region.

6. The variable transmittance film of claim 5, wherein the passageway regions are provided in at least a pair of rim regions of the n-gon which face each other.

7. The variable transmittance film of claim 1, wherein a pitch of the partition wall pattern is 100 μm to 3,000 μm.

8. The variable transmittance film of claim 1, wherein the liquid substance comprises a solvent in which colored charged particles are dispersed.

9. The variable transmittance film of claim 8, wherein the colored charged particle comprises one or more of a metal particle, an inorganic particle, a polymer particle, or a combination thereof.

10. The variable transmittance film of claim 1, wherein a viscosity of the liquid substance is 1 cps to 1,000 cps.

11. The variable transmittance film of claim 1,
wherein the first electrode substrate comprises a first base; and a transparent conductive oxide layer provided on the first base, and
the second electrode substrate comprises a second base; and a metal layer, a metal oxide layer, a metal nitride layer, a metal oxynitride layer, or a metal alloy layer provided on the second base and opposite to the transparent conductive oxide layer.

12. A smart window comprising:
the variable transmittance film according to claim 1; and
a voltage applying device electrically connected to the variable transmittance film.

* * * * *